(12) United States Patent
Senba et al.

(10) Patent No.: US 9,505,915 B2
(45) Date of Patent: Nov. 29, 2016

(54) FASTENING COMPONENT AND METHOD FOR MANUFACTURING THE FASTENING COMPONENT

(71) Applicants: Kyoto Municipal Institute of Industrial Technology and Culture, Kyoto (JP); YKK Corporation, Tokyo (JP)

(72) Inventors: Takeshi Senba, Kyoto (JP); Kazuo Kitagawa, Kyoto (JP); Akihiro Itou, Kyoto (JP); Kazuya Mizumoto, Toyama (JP)

(73) Assignees: Kyoto Municipal Institute of Industrial Technology and Culture (JP); YKK Corporation (JP)

( * ) Notice: Subject to any disclaimer, the term of this patent is extended or adjusted under 35 U.S.C. 154(b) by 0 days.

(21) Appl. No.: 14/416,094

(22) PCT Filed: Nov. 5, 2012

(86) PCT No.: PCT/JP2012/078634
§ 371 (c)(1),
(2) Date: Jan. 21, 2015

(87) PCT Pub. No.: WO2014/068790
PCT Pub. Date: May 8, 2014

(65) Prior Publication Data
US 2015/0148460 A1   May 28, 2015

(51) Int. Cl.
| | | |
|---|---|---|
| *C08L 1/02* | (2006.01) | |
| *C08L 77/00* | (2006.01) | |
| *A44B 1/02* | (2006.01) | |
| *A44B 13/00* | (2006.01) | |
| *A44B 11/00* | (2006.01) | |
| *A44B 17/00* | (2006.01) | |
| *A44B 18/00* | (2006.01) | |
| *A44B 19/26* | (2006.01) | |
| *C08J 5/04* | (2006.01) | |
| *C08K 7/02* | (2006.01) | |
| *C08L 1/04* | (2006.01) | |
| *C08L 77/02* | (2006.01) | |
| *C08L 77/06* | (2006.01) | |
| *C08L 77/08* | (2006.01) | |
| *B29C 45/00* | (2006.01) | |
| *B29K 101/12* | (2006.01) | |
| *B29K 105/12* | (2006.01) | |
| *B29K 201/00* | (2006.01) | |
| *B29K 309/08* | (2006.01) | |
| *B29L 5/00* | (2006.01) | |

(52) U.S. Cl.
CPC ........... *C08L 1/02* (2013.01); *C08J 5/045* (2013.01); *C08K 7/02* (2013.01); *C08L 1/04* (2013.01); *C08L 77/02* (2013.01); *C08L 77/06* (2013.01); *C08L 77/08* (2013.01); *A44B 19/26* (2013.01); *B29C 45/0005* (2013.01); *B29K 2101/12* (2013.01); *B29K 2105/122* (2013.01); *B29K 2201/00* (2013.01); *B29K 2309/08* (2013.01); *B29L 2005/00* (2013.01); *C08J 2300/22* (2013.01); *C08J 2377/02* (2013.01); *C08L 2205/16* (2013.01)

(58) Field of Classification Search
CPC .......... C08L 1/02; B29L 2005/00; A44B 1/02; A44B 13/0005; A44B 11/00; A44B 17/0029; A44B 18/0046; A44B 19/26
See application file for complete search history.

(56) References Cited

U.S. PATENT DOCUMENTS

| | | | | |
|---|---|---|---|---|
| 3,939,547 A | * | 2/1976 | Bernier | B05D 7/14 148/251 |
| 5,964,983 A | * | 10/1999 | Dinand | C09K 8/206 162/187 |
| 6,230,373 B1 | * | 5/2001 | Wakai | A44B 19/00 24/381 |
| 6,527,617 B1 | * | 3/2003 | Capozzi | A63H 9/00 446/369 |
| 9,179,744 B2 | * | 11/2015 | Takani | A44B 19/34 |

(Continued)

FOREIGN PATENT DOCUMENTS

| | | |
|---|---|---|
| CN | 101314643 A | 12/2008 |
| JP | 2003-339414 A | 12/2003 |

(Continued)

OTHER PUBLICATIONS

Nakagaito et al. (Composites Science and Technology 69, 2009, 1293-1297).*
International Preliminary Report on Patentability, PCT Application No. PCT/JP2012/078634, mailed May 14, 2015.
International Search Report, PCT Application No. PCT/JP2012/078634, mailed Jan. 29, 2013.
Office Action, Taiwanese Patent Application No. 102139678, mailed Jun. 11, 2015.
Office Action, Chinese Patent Application No. 201280075876.1, mailed Sep. 5, 2016, 5 pages.

*Primary Examiner* — Liam J Heincer
(74) *Attorney, Agent, or Firm* — Kilpatrick Townsend & Stockton LLP (57) ABSTRACT

A fastening component is a molded article of a mixture in which microfibrillated cellulose fibers are dispersed in a thermoplastic resin, wherein the thermoplastic resin has a melting point of between 150 and 200° C., and wherein when the total mass % of the thermoplastic resin and the cellulose fibers is set to be 100 mass %, the mass % of the cellulose fibers included in the mixture is greater than 20 mass % and less than 60 mass %. When the total mass % of the thermoplastic resin and the cellulose fibers is set to be 100%, the mass % of the cellulose fibers included in the mixture is preferably equal to or greater than 30 mass % and equal to or less than 50 mass %.

12 Claims, 4 Drawing Sheets

(56) References Cited

U.S. PATENT DOCUMENTS

| | | | | |
|---|---|---|---|---|
| 2003/0030176 A1* | 2/2003 | Monovoukas | ......... | C08L 23/04 264/211 |
| 2005/0067730 A1* | 3/2005 | Yano | ......... | D21O 5/02 264/109 |
| 2005/0253294 A1* | 11/2005 | Takano | ......... | B29C 70/34 264/138 |
| 2006/0182941 A1* | 8/2006 | Yano | ......... | B82Y 30/00 428/292.1 |
| 2007/0066467 A1* | 3/2007 | Edwards | ......... | A63B 6/00 482/148 |
| 2009/0004435 A1* | 1/2009 | Hanao | ......... | A61F 13/53 428/156 |
| 2009/0054552 A1* | 2/2009 | Yano | ......... | C08J 5/06 523/200 |
| 2009/0298976 A1* | 12/2009 | Yano | ......... | C08J 5/045 524/35 |
| 2009/0305033 A1* | 12/2009 | Yano | ......... | D21H 21/26 428/339 |
| 2010/0059715 A1* | 3/2010 | Tabata | ......... | C08L 77/02 252/500 |
| 2010/0240806 A1* | 9/2010 | Kondo | ......... | B82Y 30/00 524/35 |
| 2010/0272980 A1* | 10/2010 | Kowata | ......... | C08B 11/02 428/220 |
| 2011/0272856 A1* | 11/2011 | Rasmussen | ......... | C08J 5/045 264/297.4 |
| 2012/0214979 A1* | 8/2012 | Heiskanen | ......... | D21H 11/20 536/56 |
| 2012/0246890 A1* | 10/2012 | Hernandez | ......... | A44B 19/301 24/436 |
| 2013/0030090 A1* | 1/2013 | Nakai | ......... | C08L 77/00 524/35 |
| 2013/0066041 A1 | 3/2013 | Mitadera et al. | | |
| 2013/0180088 A1* | 7/2013 | Takani | ......... | A44B 19/34 24/415 |
| 2014/0343196 A1* | 11/2014 | Kousaka | ......... | C08J 5/04 524/35 |
| 2015/0017458 A1* | 1/2015 | Mizumoto | ......... | B29D 5/02 428/458 |
| 2015/0105499 A1* | 4/2015 | Yano | ......... | C08B 3/12 524/37 |
| 2015/0167231 A1* | 6/2015 | Semba | ......... | C08L 1/02 525/54.23 |
| 2015/0210834 A1* | 7/2015 | Mizumoto | ......... | A44B 19/24 524/409 |
| 2015/0343681 A1* | 12/2015 | Mizumoto | ......... | A44B 19/06 24/381 |

FOREIGN PATENT DOCUMENTS

| | | |
|---|---|---|
| JP | 2005-160667 A | 6/2005 |
| JP | 2008-297479 A | 12/2008 |
| JP | 2009-1597 | 1/2009 |
| JP | 2010-248406 A | 11/2010 |
| JP | 2011-213754 | 10/2011 |
| TW | 201219448 A1 | 5/2012 |
| WO | 2011/126038 A1 | 10/2011 |
| WO | 2012/056583 | 5/2012 |

\* cited by examiner

FASTENING COMPONENT AND METHOD FOR MANUFACTURING THE FASTENING COMPONENT

This application is a national stage application of PCT/JP2012/078634, which is incorporated herein by reference.

TECHNICAL FIELD

The present invention is directed to a fastening component and a method for manufacturing a fastening component.

BACKGROUND ART

Various products including a buckle, a slide fastener, a snap button, and a surface fastener and so on have been developed and produced as fastening devices. Such fastening devices may be made of metal or resin. These fastening devices have been used not only in commodities such as a clothing or a bag and so on but also in special purpose application such as for space use or underwater use.

PTL1 discloses that cellulose fibers are included in a tape or an element of a slide fastener in order to obtain recyclability.

PTL2 discloses a technique for efficiently miniaturize plant fibers using a bead mill where microfibrillated plant fibers are altered to be hydrophobic thereby improving an adhesion with a resin.

PTL3 discloses a method for manufacturing a thermoplastic resin mixture including cellulose fibers. As explained in the abstract of PTL3, the manufacturing method disclosed in PTL3 includes a process to introduce cellulose fiber cotton and thermoplastic resin into a mixer that is provided with a rotational blade for mixing them, thereby melting the thermoplastic resin by the generated friction heat and producing a blend in which the thermoplastic resin adheres to the cellulose fibers; and a process to mix the blend while cooling it.

CITATION LIST

Patent Literature

[PTL 1] International Publication No. 2012/056583
[PTL 2] Japanese Patent Application Laid-open No. 2011-213754
[PTL 3] Japanese Patent Application Laid-open No. 2009-1597

SUMMARY OF INVENTION

Technical Problem

It might be preferable to add reinforcing fibers into a resin in an effort to improve the strength of fastening components. The reinforcing fibers that are usually added to fastening components are generally selected from a group of fibers each having relatively higher heat resistance property such as a glass fiber or a carbon fiber and so on. However, a limit may exist in further improving the property of the fastening component or in allocating, to the fastening component, a property or characteristic which is different from conventional ones.

Solution to Problem

A fastening component according to the present invention may be a fastening component that is a molded article of a mixture in which microfibrillated cellulose fibers are dispersed in a thermoplastic resin, wherein the thermoplastic resin has a melting point of between 150 and 200° C., and wherein when the total mass % of the thermoplastic resin and the cellulose fibers is set to be 100 mass %, the mass % of the cellulose fibers included in the mixture is greater than 20 mass % and less than 60 mass %.

Preferably, when the total mass % of the thermoplastic resin and the cellulose fibers is set to be 100%, the mass % of the cellulose fibers included in the mixture may be equal to or greater than 30 mass % and equal to or less than 50 mass %.

Preferably, the mixture may further include an inorganic pigment.

Preferably, the mass % of the inorganic pigment in the mixture may be between 0.5 and 5 mass %, the inorganic pigment being added in addition to the total 100 mass % of the thermoplastic resin and the cellulose fibers.

Preferably, the mixture melted at a melt temperature of 220° C. may have a melt viscosity of equal to or less than 500 Pa/s at shear velocity of 12160 $sec^{-1}$ and of equal to or greater than 5000 Pa/s at shear velocity of 12.16 $sec^{-1}$.

Preferably, the thermoplastic resin may comprise polyamide.

Preferably, a specimen having a predetermined size which is obtained through melting the fastening component may have a bending strength that is equal to or greater than 100 MPa.

Preferably, a specimen having a predetermined size which is obtained through melting the fastening component may have a bending elastic modulus that is equal to or greater than 4000 GPa.

Preferably, the fastening component may be a fastener slider for a slide fastener.

A method for manufacturing a fastening component according to the present invention may comprise:

a first step for supplying a melted mixture into a mold, the mixture comprising a thermoplastic resin and microfibrillated cellulose fibers dispersed in the thermoplastic resin, the melting point of the thermoplastic resin being between 150 and 200° C., and the mass % of the cellulose fibers included in the melted mixture is greater than 20 mass % and less than 60 mass % when the total mass % of the thermoplastic resin and the cellulose fibers is set to be 100 mass %; and a second step for cooling the melted mixture filled in the mold.

Advantageous Effects of Invention

According to the present invention, further improvement in the property of the fastening component or allocation of property or characteristic which is different from conventional ones to a fastening component may be achieved.

DESCRIPTION OF EMBODIMENTS

A fastening component according to the present invention may be a molded article that includes a mixture in which microfibrillated cellulose fibers are dispersed in a thermoplastic resin, the melting point of the thermoplastic resin being between 150 and 200° C., and the mass % of the cellulose fibers included in the mixture being greater than 20 mass % and less than 60 mass % when the total mass % of the thermoplastic resin and the cellulose fibers is set to be 100 mass % (this mixture may be hereinafter simply referred to as the mixture).

In the present embodiment, the cellulose fibers are utilized as reinforcing fibers to be added to the thermoplastic resin. In general, a reinforcing fiber normally added to the fastening component is selected from a group of fibers each having sufficient heat resistance property such as a glass fiber or a carbon fiber and so on. In the present embodiment, despite this standard, the cellulose fiber is utilized as the reinforcing fiber for reinforcing the fastening component. The melting point of the thermoplastic resin is between 150 and 200° C., and therefore an alteration of the microfibrillated cellulose fibers dispersed in the melting resin may be suppressed to some degree. The mass % of the cellulose fibers is greater than 20 mass % and less than 60 mass %, and thus the strength of the fastening component and the formability of the fastening component when being molded are suitably balanced. This feature will be supported from the comparison of examples and comparative examples described below. Owing to the light-weight and high-strength properties of the cellulose fibers, desired property of the fastening component may be achieved. Based on a fact that the cellulose fiber is recyclable biomass resource, it could be said that environmental performance of the fastening component would be improved.

In particular, in the present embodiment, microfibrillated cellulose fibers are used as the reinforcing fiber, and therefore suitable and adequate strength of the fastening component may be obtained. The microfibrillated cellulose fibers exist in a three-dimensional net, and therefore the strength of the fastening component may be preferably secured without losing its lightweight property. As widely known for the skilled person in the art, the microfibrillated cellulose fiber may be a bundle of hydrogen-bonded straight-chain celluloses.

Preferably, the melting point of the thermoplastic resin may be measured by a differential scanning calorimeter, so-called DSC (Differential Scanning calorimeter). The differential scanning calorimeter detects a difference in amounts of absorbed heat between a measurement sample and a standard sample, and then determines the melting point of the measurement sample. This method has been widely used in the field of polymer. For example, a DSC named EXSTAR600 produced by SEIKO Instruments Inc. may be used. If the thermoplastic resin includes different types of thermoplastic resins, the highest temperature at the top of the heat absorption peak may be utilized as the melting point, preferably. The measurement by DSC may be either based on a heat flux or an input compensation. An α-alumina may be used as a primary standard substance, but the primary standard substance could be omitted. DSC measurement may preferably be performed at 10° C./min.

Any methods for measurement may be employed for each mass % of the thermoplastic resin and the cellulose fibers. For example, each mass % of the thermoplastic resin and the cellulose fibers may be determined by: melting the fastening component and separating the cellulose fibers from the thermoplastic resin by means of filtration and so on; and calculating the mass ratio of the thermoplastic resin against the mass of the fastening component and the mass ratio of the cellulose fibers against the mass of the fastening component. In the filtering, hexafluoroisopropanol (HFIP) may preferably be used as a solvent when the thermoplastic resin may be polyamide PA11 or polyacetal POM. When the thermoplastic resin is polypropylene PP, dichlorobenzene may preferably be used as a solvent.

(Embodiments of Fastening Devices)

The fastening component may be a part of a buckle, a part of a slide fastener, a part of a snap button, or a part of a surface fastener. For example, the fastening component may be a part of a slide fastener 100 illustrated in FIGS. 1 and 2.

Figure 1:
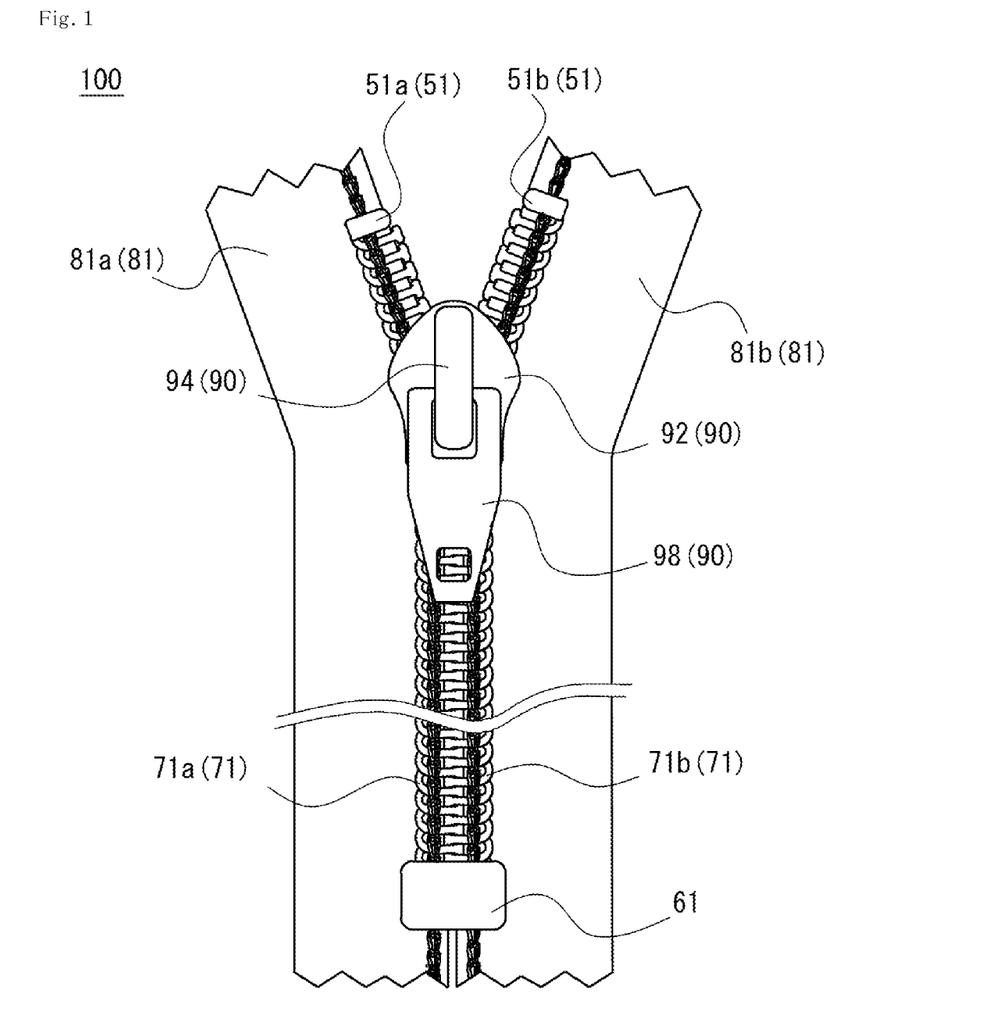
FIG. 1 is a schematic diagram of a slide fastener that is one example of a fastening component according to the present invention.

Explanation about the configuration of the slide fastener 100 will follow with reference to FIG. 1. As shown in FIG. 1, the slide fastener 100 comprises a pair of right and left fastener tapes 81 (81a, 81b); a pair of right and left coil elements 71 (71a, 71b) each of which is disposed at the inner side edge of the fastener tape 81; a pair of right and left upper stops 51 (51a, 51b), a bottom stop 61 commonly used in right and left, and a resin-made fastener slider 90 into which the pair of right and left coil elements 71 have been inserted. The fastener slider 90 comprises a slider body 92 to which a pull 98 is attached via a post 94. As widely known, the slider body 92 comprises an upper wing and a lower wing which are arranged via a coupling pillar to oppose one another in which Y-shaped element passage is provided therebetween.

Explanation will be made on another configuration of the slide fastener 100 with reference to FIG. 2. The slide fastener 100 shown in FIG. 2 includes right and left element rows 75 (75a, 75b) in which individual elements are aligned by a predetermined space instead of the coil element 71 shown in FIG. 1. Further, a separable bottom stop 65 is included, replacing the bottom stop 61 shown in FIG. 1. The separable bottom stop 65 includes a box 65a, a box pin 65b, and an insertion pin 65c. The configurations of the slide fasteners 100 shown in FIGS. 1 and 2 are exemplary only, and this should not be relied upon for narrowly construing the fastening component disclosed herein.

Figure 2:
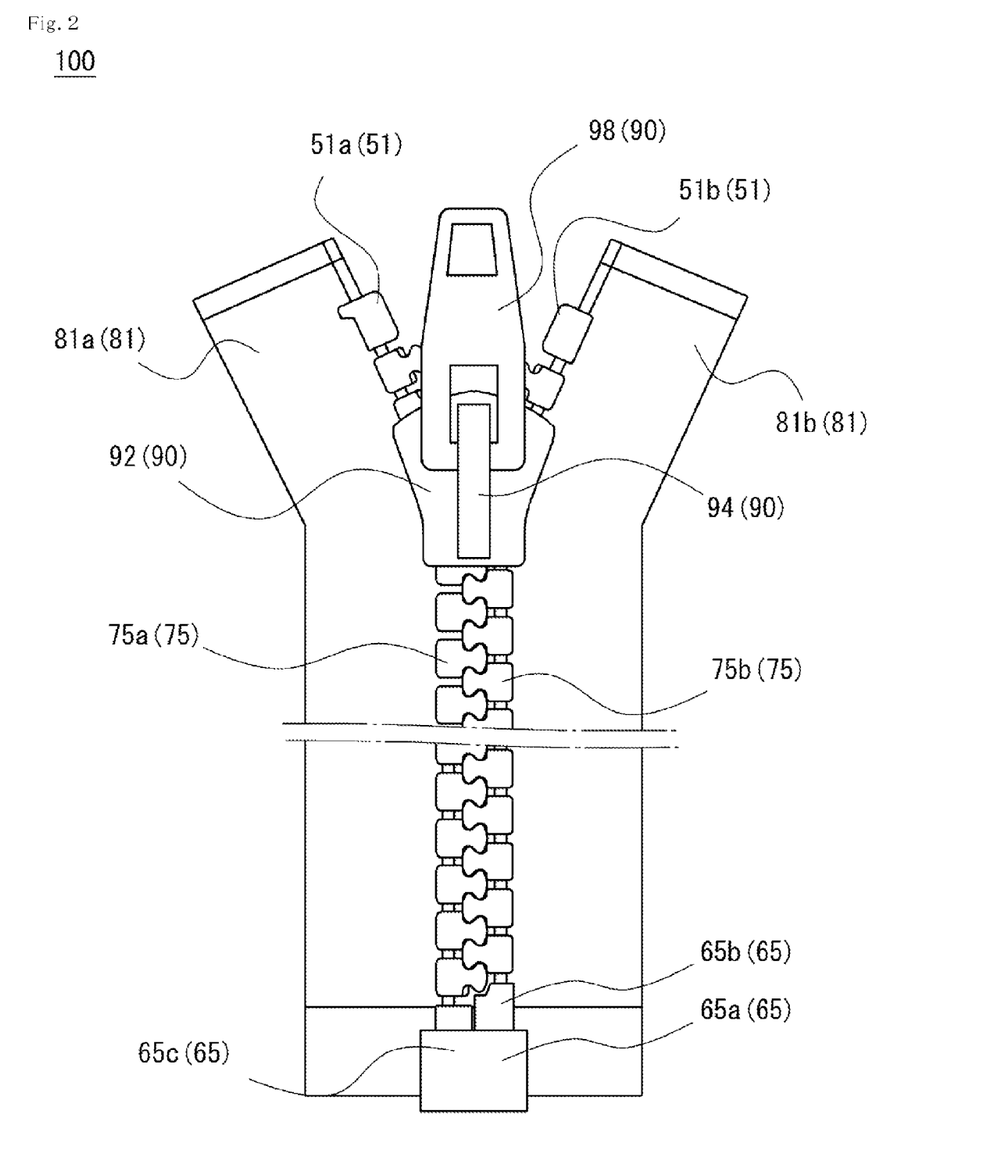
FIG. 2 is a schematic diagram of a slide fastener that is one example of a fastening component according to the present invention.

The fastening component disclosed herein may be the fastener slider 90 shown in FIGS. 1 and 2, typically may be the slider body 92. Preferably, the slider body 92 has higher/greater strength.

The fastening component disclosed herein may be the upper stop 51 shown in FIG. 1 or the bottom stop 61 shown in FIG. 1 or the separable bottom stop 65 shown in FIG. 2, for example. The fastening component disclosed herein may be the element included in the element row 75 shown in FIG. 2, for example. These parts for forming a movement path for the fastener slider 90 and being arranged along such path may be essential for proper functioning of the slide fastener 100, and preferably have higher/greater strength.

As described above, the fastening component according to the present disclosure may be a part of a buckle, a part of a snap button, or a part of a surface fastener. Explanations on each of them with reference to individual figure will be omitted. With respect to the buckle, the fastening component according to the present disclosure may be at least one of male and female buckles of a pair. With respect to the snap button, it may be at least one of male and female buttons of a pair. With respect to the surface fastener, it may be at least one of male and female surface fasteners of a pair. It may be preferable to utilize the fastening component according to the present disclosure for both of the male and female parts of the fastening components.

(Cellulose Fibers)

Explanation will be made on the cellulose fiber included in the mixture. The diameter of the microfibrillated cellulose fiber may typically be between 4 and 1000 nm, suitably between 4 and 200 nm, and more suitably between 4 and 100 nm. A cellulose may exist as a single cellulose nanofiber in plants, and its fiber diameter may be 4 nm. The cellulose included in the cellulose fiber may preferably be chemically treated to have hydrophobicity, and thereby affinity between the cellulose fiber and the resin may be improved.

Mass % of the microfibrillated cellulose fibers included in the mixture may be greater than 20 mass % and less than 60 mass %, as described above. In some embodiments, when the total mass % of the thermoplastic resin and the cellulose fibers is set to be 100 mass %, the mass % of the cellulose fibers included in the mixture may be equal to or greater than 30 mass % and equal to or less than 50 mass %. This feature will be supported by examples described later. If this condition of equal to or greater than 30 mass % and equal to or less than 50 mass % is satisfied, the strength of the fastening component and the formability of the fastening component when being molded may be suitably balanced.

(Dispersiveness of Cellulose Fibers in Composition)

In the mixture, i.e. in the thermoplastic resin, the cellulose fiber microstructures of suitable number of bundles of the straight-chain celluloses are uniformly dispersed. It could be said that there may be some differences in its density distribution, but they are dispersed uniformly as a whole. In regard to this issue, it would be difficult to evaluate the dispersiveness of the cellulose fiber from a solid fastening component in general, but the evaluation can be made as described later by melting the fastening component and then measuring its melt viscosity.

As for the melt mixture melted at a melt temperature of 220° C., the melt viscosity at a shear velocity of 12160 sec$^{-1}$ is equal to or less than 500 Pa/s, and the melt viscosity at a shear velocity of 12.16 sec$^{-1}$ is equal to or greater than 5000 Pa/s. If such melt viscosity is measured, it could be said that the dispersiveness of the cellulose fibers in the mixture tends to be appropriate and the strength of the fastening component tends to be adequately secured.

In light of the outcome of examples described below, as for the melt mixture melted at the melt temperature of 220° C., the melt viscosity at a shear velocity of 12160 sec$^{-1}$ is equal to or less than 400 Pa/s, and the melt viscosity at a shear velocity of 12.16 sec$^{-1}$ is equal to or greater than 8000 Pa/s, preferably.

The method for measurement of the melt viscosity should follow JIS-K7199. For example, a capillary rheometer (apparatus for measuring melt viscosity) 10 shown in FIG. 3 will be used. The capillary rheometer 10 includes a stationary metal part 22, a capillary nozzle 23, and an entrance 24 in this order from the lower end of a cylinder 21. A piston 29 in which a rod 26 is provided at lower end of a bar 25 is arranged at the side of upper end of the cylinder 21 in an up-down movable manner. An O-ring 27 is provided between the outer circumference of the piston 29 and the inner circumference of the cylinder 21, and thereby a space underneath the piston 29 is kept in liquid-tight. The lower end of the rod 26 is provided with a pressure sensor 28 in any manner. Melt sample 20 is introduced into a lower part of the cylinder 21, and will be supplied by capillary action to a space underneath the rod 26 through the capillary nozzle 23 and the entrance 24.

Figure 3:
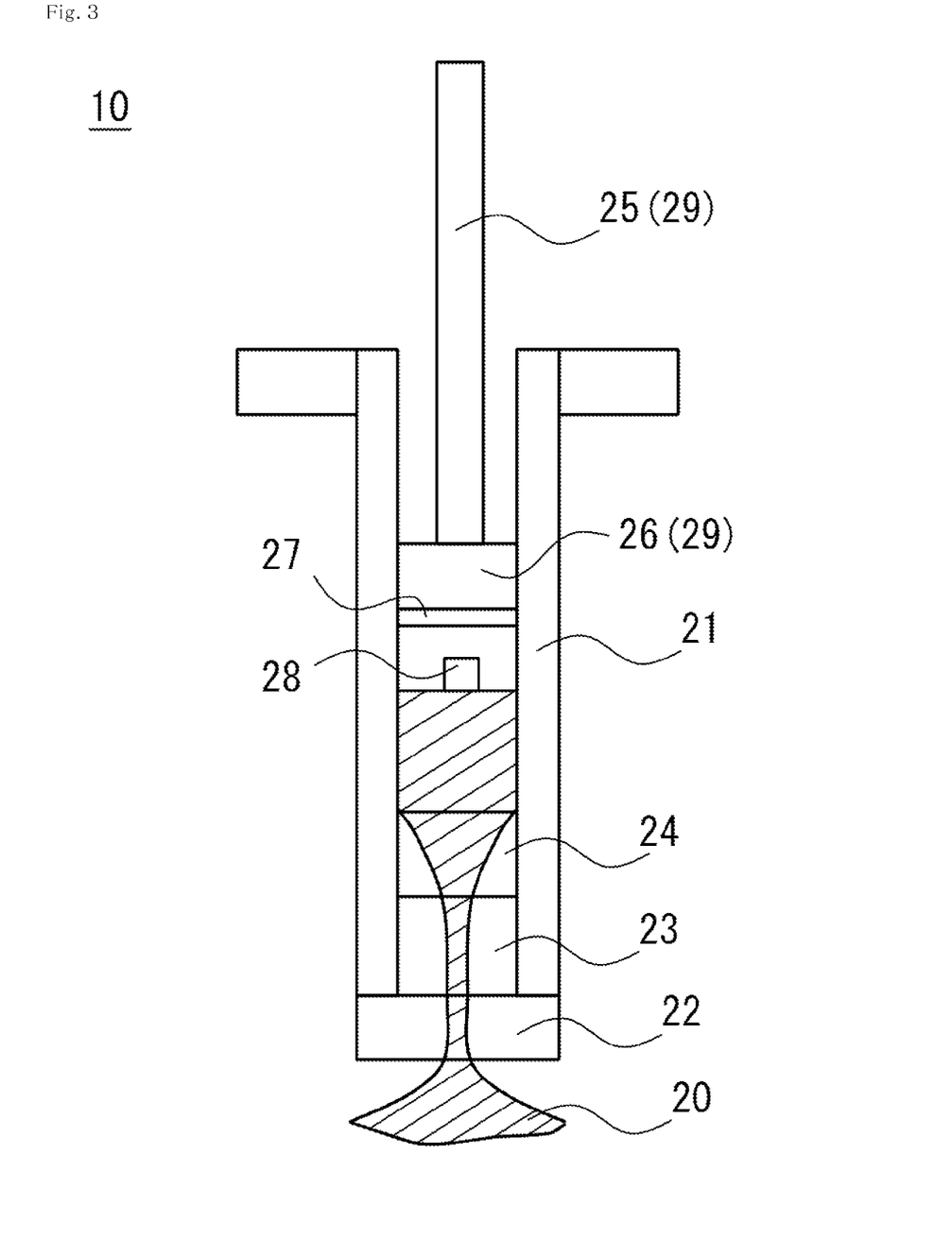
FIG. 3 is a schematic diagram of an apparatus used for measuring a viscosity of a melted thermoplastic resin.

The melt viscosity η of a sample (the mixture in which microfibrillated cellulose fibers are dispersed in the thermoplastic resin) is calculated by the following expression. It should be noted that shear stress is determined in accordance with an output value of the pressure sensor. The shear velocity will change in accordance with the lowering moving speed of the piston 29.

$$\eta = \frac{\tau}{\dot{\gamma}}$$ [Math. 1]

where τ=shear stress (Pa) and $\dot{\gamma}$=shear speed (1/s).

An exemplary test temperature may be 220° C., and this exceeds the melting point of the thermoplastic resin in the range of between 150 and 220° C. The capillary nozzle 23 may have a length of 10 mm and an inner diameter of 1 mm. The above described sample is dried in vacuum for 6 hours at 80° C., and is used as a sample for measurement. The measurement sample is filled in the cylinder and heated for 5 minutes, and then a test for determining the viscosity is performed. Exemplary test speed is 0.5, 1, 2, 5, 10, 20, 50, 100, 200, 500, and 1000 (mm/min). Exemplary shear velocity is 6.08, 12.16, 24.32, 60.80, 121.6, 243.2, 608.0, 1216, 2432, 6080, 12160 (1/s).

As for the melt viscosity, in general, if the shear velocity increases, the melt viscosity decreases accordingly. This tendency holds true in the present embodiment. However, as the cellulose fibers are microfibrillated, it may be observed that: in the region of lower shear velocity, the cellulose fibers effectively block the movement of the thermoplastic resin, and thus relatively higher melt viscosity, i.e. equal to or greater than 5000 Pa/s or equal to or greater than 8000 Pa/s may be measured; and in the region of higher shear velocity, relatively lower melt viscosity, i.e. equal to or less than 500 Pa/s or equal to or less than 400 Pa/s may be measured as the oriented cellulose fibers do not serve to block the movement of the thermoplastic resin.

In view of the result of examples described later, as for the mixture melted at melt temperature of 220° C., when the melt viscosity at shear velocity of 12.16 sec$^{-1}$ is M, and the melt viscosity at shear velocity of 12160 sec$^{-1}$ is N, 40≤M/N≤120 is preferably satisfied, and more preferably 45≤M/N≤116 is satisfied.

(Addition of Inorganic Pigment)

In some embodiments, an inorganic pigment may be added to the mixture. Accordingly, the degree of color change of the fastening component due to the burning of the cellulose fibers because of the thermal effect at the time of molding will be minimized. In some cases, deterioration of color reproducibility due to the color change of the thermoplastic resin because of the thermal effect at the time of molding and so on may be compensated. Lowering in strength may not be caused by the addition of appropriate amount of the inorganic pigment. It is assumed that this is because dispersed size of the cellulose fiber is smaller than that of the glass fiber and so on. The dispersed size of the glass fiber may be diameter of 10 μm*length of 300 μm. On the other hand, the dispersed size of the cellulose fiber may be diameter of between 0.004 and 0.02 μm*length of 1 μm. If the diameter of single or aggregate of pigment is between 0.2 and 5 μm and when viewed from the pigment particle, the cellulose fiber may exist as a fiber that is quite thinner than the glass fiber.

The inorganic pigment may be one or more pigments selected from a group of a white pigment, a red pigment, a blue pigment, a yellow pigment, and a black pigment. The white pigment may be, for example, titanium dioxide (rutile, anatase) $TiO_2$, zinc sulfide ZnS, ceruse $2PbCo_3 \cdot Pb(OH)_2$, zinc oxide ZnO, lithopone $BaSO_4+ZnS$, antimony trioxide $Sb_2O_3$ and so on, but not limited to. The red pigment may be, for example, a cobalt violet $Co_3(PO_4)^2$, cadmium red CdS.nCdSe, vermilion HgS, molybdenum orange $MoPbO_4$, colcothar $Fe_2O_3$ and so on, but not limited to. The blue pigment may be, for example, chromic oxide $Cr_2O_3$, ultramarine $2(Al_2Na_2SiO)$, prussian blue $KFe[Fe(CN)_6]$, and cobalt blue $CoO.nAl_2O_3$, but not limited to. The yellow pigment may be, for example, chrome yellow $PbCrO_4$, cadmium yellow CdS, zinc chromate $ZnCrO_4$, and yellow orcher FeO.OH, but not limited to. The black pigment may typically be carbon black, but not limited to. Inexpensive conditioners for adjusting the tone of color such as barium sulfate $BaSO_4$, barium carbonate $BaCO_3$, calcium carbonate $CaCO_3$, calcium sulfate $CaCO_4$, and silica $SiO_2$ and so on may be used.

Preferably, powdered inorganic pigments may be used. Mass % and particle diameter of the inorganic pigment may be suitably tailored to obtain appropriate dispersiveness and chromogenic property. If the particle diameter of the inorganic pigment is too large, degree of color adjustment by the inorganic pigment may possibly be lowered; and if it is too small, condensation thereof due to Van der Waals force may possibly triggered. In light of such aspects, median size of the inorganic pigment may typically be equal to or less than 5.0 μm, preferably equal to or less than 3.0 μm, and typically equal to or greater than 0.1 μm, preferably equal to or greater than 0.2 μm. The median size of the pigment particles can be measured by a laser diffraction based on JIS 8825-1:2001.

Any content of pigment in the mixture may be employed, but its mass % may be at least equal to or less than that of the cellulose fiber included in the mixture. If the pigment has greater mass % than that of the cellulose fiber, formability of the mixture may be deteriorated, and it may be difficult to obtain adequate strength of the fastening component. Preferably, the pigment included in the mixture has mass % which is fairly less than the mass % of the cellulose fiber included in the mixture. Preferably, inorganic pigment of between 0.5 and 5 mass % is included in the mixture in addition to the thermoplastic resin and the cellulose fiber which present 100 mass % in total. Not limited to this range, the mass % of equal to or less than 10.0 mass %, preferably equal to or less than 5.0 mass % may be employed. From a standpoint of color reproducibility, the mass % of the pigment included in the mixture may preferably be equal to or greater than 0.5 mass %, and more preferably equal to or greater than 1.0 mass %.

(Thermoplastic Resin)

Any material may be employed for the thermoplastic resin, if its melting point is between 150 and 200° C. In a preferred embodiment, the thermoplastic resin may be a polyamide. The melting point of the polyamide differs from one molecular structure to another, but from a viewpoint of suppressing the burning of the cellulose fibers the polyamide having the melting point between 150 and 200° C. may be used. The polyamide tends to be yellowed as the melting point increases, and its strength or rigidity tends to decrease as the melting point decreases. From this viewpoint, the polyamide having melting point between 150 and 200° C. may be preferably used. This changing-to-yellow property of the polyamide can be compensated by the addition of the inorganic pigment of white color and so on. The melting point of the polyamide can be determined by using the above-described differential scanning calorimeter.

The polyamide may be produced through copolycondensation of diamine and dicarboxylic acid; polycondensation of w-amino acids; and ring-opening polymerization of lactam and so on. As for the diamine, for example, aliphatic diamine of straight-chain or branched-chain such as ethylene diamine, propylene diamine, butylene diamine, hexamethylenediamine, 2-methylpropane diamine, 3-methylpropane diamine, octamethylene diamine, decane diamine, dodecane diamine and so on; aromatic series diamine such as metaxylylene diamine, paraxylylene diamine, metaphenylene diamine, paraphenylene diamine and so on; alicylic diamine such as isophorone diamine, 2-aminomethyl piperidine, 4-aminomethyl piperidine, 4,4'-diaminodicyclohexylenemethane, 4,4'-diamino-3,3'-dimethyldicyclohexylenemethane, 1,3-di(4-piperidyl)-propane, 1,2-diamino cyclohexane, 1,3-diamino cyclohexane, 1,4-diamino cyclohexane, N-aminopropylpiperazine, 4,4'-diamino dicyclohexylenepropane, 1,2-bis(aminomethyl)cyclohexane, 1,3-bis(aminomethyl)cyclohexane and 1,4-bis(aminopropyl)piperazine and so on can be listed. As for the dicarboxylic acid, for example, aliphatic dicarboxylic acid of straight-chain or branched-chain such as succinic acid, propanediacid, butanedioic acid, pentanedioic acid, adipic acid, heptanedioic acid, octanedioic acid, nonanedioic acid, decanedioic acid, dodecanedioic acid, undecanedioic acid, dimer acid, hydrogenated dimer acid and so on, aromatic series dicarboxylic acid such as phthalic acid, terephthalic acid, isophthalic acid, naphthalenedicarboxylic acid, 2-chloroterephthalic acid, 2-methylterephthalic acid, 5-methylisophthalic acid, and 5-sodium sulfoisophthalic acid and 1,5-naphthalenedicarboxylic acid and so on, dicarboxylic acid having nonaromatic series group such as 1,4-cyclohexanedicarboxylic acid, 1,2-cyclohexanedicarboxylic acid, 1,3-cyclohexanedicarboxylic acid, tetrahydrophthalic acid, tetrahydroanhydrophthalic acid, hexahydrophthalic acid, hexahydroanhydrophthalic acid, 3-methyl-1,2,3,6-tetrahydroanhydrophthalic acid, 4-methyl-1,2,3,6-tetrahydroanhydrophthalic acid, 3-methyl-1,2,3,6-tetrahydrophthalic acid, 4-methyl-1,2,3,6-tetrahydrophthalic acid, 3-methyl-hexahydroanhydrophthalic acid, 4-methylhexahydroanhydrophthalic acid, 3-methylhexahydrophthalic acid, 4-methylhexahydrophthalic acid and so on can be listed. As for the ω-amino acid, for example, 6-aminohexane acid, 11-aminoundecanoic acid, 12-aminododecanoic acid, 4-piperidine carboxylic acid, 3-piperidine carboxylic acid, and 2-piperidine carboxylic acid and so on can be listed. As for the lactam, ε-caprolactam, undecane lactam, lauryl lactam and so on can be listed.

As for examples of polyamide, polycaproamide (nylon 6), polydodecaneamide (nylon 12), polytetramethyleneadipamide (nylon 46), polyhexamethyleneadipamide (nylon 66), polyundecamethyleneadipamide (nylon 116), polymetaxylyleneadipamide (nylon MXD6), polyparaxylylene adipamide (nylon PXD6), polytetramethylenesebacamide (nylon 410), polyhexamethylenesebacamide (nylon 610), polydecamethyleneadipamide (nylon 106), polydecamethylenesebacamide (nylon 1010), polyhexamethylene dodeca amide (nylon 612), polydecamethylene dodeca amide (nylon 1012), polyhexamethylene isophthal amide (nylon 6 I), polyhexamethylene terephthal amide (nylon 6T), polybis(3-methyl-4-aminohexyl)methane terephthal amide (nylon PACMT), polybis(3-methyl-4-aminohexyl)methane isophthal amide (nylon PACM I), polybis(3-methyl-4-aminohexyl)methane dodeca amide (nylon PACM12), polybis(3-methyl-4-aminohexyl)methane tetradeca amide (nylon PACM14), polytetramethyleneterephthalamide (nylon 4T), polypentamethyleneterephthalamide (nylon 5T), poly-2-methylpentamethyleneterephthalamide (nylon M-5T), polyhexamethylenehexahydroterephthalamide (nylon 6T (H)), poly2-methyl-octamethylene terephthalamide, polynonamethylene terephthalamide (nylon 9T), polydecamethyleneterephthalamide (nylon 10T), polyundecamethyleneterephthalamide (nylon 11T), polydodecamethyleneterephthalamide (nylon 12T), polybis (3-methyl-4-aminohexyl)methane terephthalamide (nylon PACMT), polybis(3-methyl-4-aminohexyl)methane isophthalamide (nylon PACM I), polybis(3-methyl-4-aminohexyl)methane dodeca amide (nylon PACM12), and polybis(3-methyl-4-aminohexyl)methane tetradeca amide (nylon PACM14) and so on can be listed. These material may be independently used or two or more of these material may be mixed and used.

Furthermore, copolymer produced by any combination of repeating unit of polyamide can be used. As for such polyamide copolymer, caprolactam/hexamethylene.adipoamide copolymer (nylon 6/6,6), hexamethylene.adipoamide/caprolactam copolymer (nylon 6,6/6), hexamethylene.adipoamide/hexamethylene-azelamide copolymer (nylon 6,6/6, 9) and so on can be listed, but not limited to.

(Strength Property of Fastening Device)

As clearly understandable in view of examples described later, in a preferred embodiment, bending strength of a specimen of a predetermined size which is obtained through melting the fastening component is equal to or greater than 100 MPa. In a preferred embodiment, the bending elastic modulus of a specimen of a predetermined size which is obtained through melting the fastening component is equal to or greater than 4000 GPa.

The bending test should follow JIS-K7171, ISO178. Typical size of the specimen may be 80*10*4 mm in the order of Length*width*thicknes. The test speed may be 10 mm/min. For the distance L between supporting points for supporting the specimen, L=64 mm is satisfied. For the radius R1 of the pad, R1=5 mm is satisfied.

The bending stress is calculated by the mathematical expression 2 where the maximal value of σ represents the bending strength.

$$\sigma = \frac{3FL}{2bh^2} \quad \text{[Math. 2]}$$

where, σ represents bending stress, F represents bending load, L represents distance between supporting points, b represents width of specimen, and h represents thickness of specimen.

A bending elastic modulus is calculated based on a secant method that calculates the modulus of elasticity from a bending stress slope in a defined distortion interval of between 0.05 and 0.25%. A bending stress $\sigma_1$ and a bending stress $\sigma_2$ are calculated by the mathematical expression 2 from the load at a flexure (mm) that is calculated by the mathematical expression 3, and then a bending elastic modulus E is calculated by the mathematical expression 4.

$$s = \frac{\varepsilon_i L^2}{6h} \quad \text{[Math. 3]}$$

where, S represents flexure, the unit thereof is mm. $\varepsilon_i$ represents distortion. Specifically, for the distortion when i=1, $\varepsilon_1=0.0005$ is satisfied, and for the distortion when i=2, $\varepsilon_2=0.0025$ is satisfied. L represents distance between supporting points. h represents thickness of specimen.

$$E = \frac{\sigma_2 - \sigma_1}{\varepsilon_2 - \varepsilon_1} \quad \text{[Math. 4]}$$

where, $\varepsilon_1=0.0005$ and $\varepsilon_2=0.0025$. $\sigma_1$ represents bending stress which corresponds to $\varepsilon_1=0.0005$. $\sigma_2$ represents bending stress which corresponds to $\varepsilon_2=0.0025$.

Any other methods may be employed for measuring the strength of the specimen.

(Method for Manufacturing a Fastening Component)

A manufacturing method according to the present embodiment comprising: a first step for supplying, to a mold, a melt mixture in which microfibrillated cellulose fibers are dispersed in a thermoplastic resin, the melting point of the thermoplastic resin being between 150 and 200° C., and the mass % of the cellulose fiber included in the melt mixture is greater than 20 mass % and less than 60 mass %; and a second step for cooling the melt mixture filled in the mold.

Figure 4:
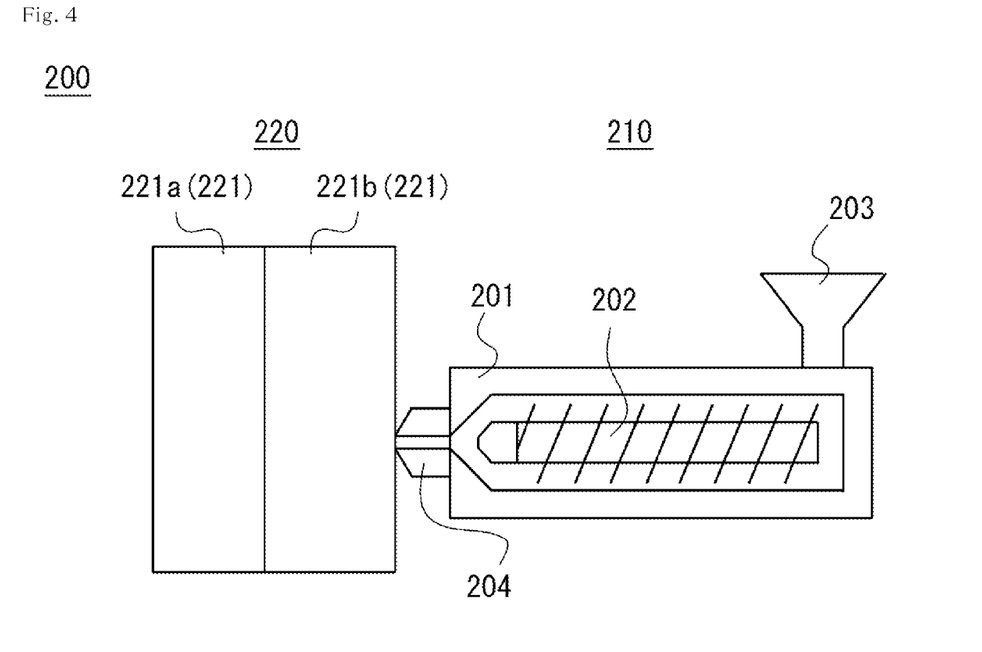
FIG. 4 is a schematic process chart illustrating a manufacturing process of a fastening component according to the present invention.

The exemplary molding apparatus 200 shown in FIG. 4 may be employed to produce the fastening components. The molding apparatus 200 has a mixer 210 for mixing the melt mixture and a molding part 220 for molding the melt mixture supplied from the mixer 210. In the mixer 210, a conveyance screw 202 is rotatably provided in a hollow cylinder 201. The melt mixture is conveyed as the conveyance screw 202 rotates and during which the cellulose fibers are adequately dispersed in the thermoplastic resin. The introductory port of the introductory part 203 of the mixer 210 is provided as a wide mouth, and thereby facilitating easier introduction of the melt mixture into the internal space of the cylinder 201. The melt mixture is supplied to the molding part 220 side from the cylinder 201 via the nozzle 204 of the mixer 210.

The molding part 220 may be a commonly used molding apparatus including one or more molds, and may include a first mold 221a and a second mold 221b in the case of FIG. 3, but not limited thereto though. Each of the first mold 221a and the second molds 221b is provided with a molding cavity (not shown) for shaping molded articles. Further, at least the second mold 221b is provided with a runner (not shown) for communicating the mold cavity of the second mold 221b and the nozzle 204. When the melt mixture is being supplied to the molding cavity, the first mold 221a and the second mold 221b are kept at a temperature around the melting point of the thermoplastic resin. The first mold 221a and the second mold 221b are cooled by any means, and the melt mixture filled in the molding cavity is solidified.

The mixture mixed in the mixer 210 is the melt mixture in which microfibrillated cellulose fibers are dispersed in the thermoplastic resin. Preferably, the mixture has been melted before it is supplied to the cylinder 201 via the introductory slot of the introductory part 203, but not necessarily limited thereto the mixture may be transformed to a melt state by heating the cylinder 201. If the retained temperature for mixing is set to be substantially equal to the melting point between 150 and 200° C. of the thermoplastic resin, lower temperature process may be facilitated compared with a case where higher melting point of the thermoplastic resin is employed.

(Method for Manufacturing Microfibrillated Cellulose Fibers)

Any method for manufacturing microfibrillated cellulose fibers may be employed, but exemplary description is made below for a typical and suitable manufacturing method. For example, a suspension in which pulp is suspended in water is introduced into a bead mill so that fibers of the pulp are fibrillated. Typically, the pulp may be a pulp obtained through a pulping process of woods and so on or a recycling process of paper resources. For example, one or more pulps selected from a group consisting of chemical pulp (kraft pulp (KP), sulfite pulp (SP), semichemical pulp (SCP), semiground pulp (CGP), chemi-mechanical pulp (CMP), groundwood pulp (GP), refinery mechanical pulp (RMP), thermo-mechanical pulp (TMP), and chemi-thermo-mechanical pulp (CTMP) may be used. The pulp may be subjected to delignification or bleaching so that an amount of lignin present in the plant fiber may be regulated.

Higher fiber strength conifer-originated various kraft pulp (conifer unbleached kraft pulp (hereinafter occasionally referred to as NUKP), conifer oxygen-exposed unbleached kraft pulp (hereinafter occasionally referred to as NOKP), conifer bleached kraft pulp (hereinafter occasionally referred to as NBKP)) may be particularly preferable among various pulps.

The microfibrillated cellulose may be such that hydroxyl groups of glucose units have been partially transformed. For example, (i) hydrophobized cellulose fiber that is transformed by a hydrophobization agent; (ii) anionized cellulose fiber that is transformed by an anionization agent; or (iii) cationized transformed cellulose fiber that is transformed by a cationization agent may be used. The hydrophobized transformed cellulose fibers are utilized so that the affinity with the resin may be improved.

Any hydrophobization reaction that is to hydrophobize and transform the cellulose fibers may be employed, but instead it may be esterified using an acid halide. As for acid halide, acid chloride of carbon number of between 4 and 18, in specific, acid chloride having alkyl group or alkenyl group such as butyryl chloride, hexanoyl chloride, octanoyl chloride, decanoyl chloride, dodecanoyl chloride, stearoylchloride, oleoyl chloride and so on, and acid chloride having an aromatic ring such as benzyl chloride and so on can be listed, and one of them or two or more of them may be used.

Instead of esterifying using acid halide, the cellulose fiber may be half-esterified by alkyl or alkenyl succinic anhydride, and then a part of the whole of the generated carboxylic acid is neutralized by an alkali such as a metallic hydroxide and so on. As for the alkyl or alkenyl succinic anhydride, olefin-originated skeleton having carbon number of between 4 and 20 and a chemical compound having anhydro maleic acid skeleton can be listed. Specifically, alkyl succinic anhydride such as octyl succinic anhydride, dodecyl succinic anhydride, hexadecyl succinic anhydride, octadecyl succinic anhydride and so on, and alkenyl succinic anhydride such as pentenyl succinic anhydride, hexenyl succinic anhydride, octenyl succinic anhydride, decenyl succinic anhydride, undecenyl succinic anhydride, dodecenyl succinic anhydride, tridecenyl succinic anhydride, hexadecenyl succinic anhydride, octadecenyl succinic anhydride and so on can be listed, one of them or two or more of them together can be used. For example, alkenyl succinic anhydride having olefin skeleton of carbon number of 16 is represented by "ASA-C16".

1) Reaction Using Acid Halide

The amount of acid halide to be used may suitably be around between 0.1 and 200 weight part, more preferably around between 0.5 and 150 weight part, and yet more preferably around between 1 and 100 weight part, per the cellulose-fiber-included mixture of 100 weight part.

The reaction temperature of cellulose-fibers-included mixture and the acid halide may suitably be between −20 and 150° C., and more preferably between −10 and 130° C., and yet more preferably between 0 and 100° C. Further, a period of time for the reaction of cellulose-fibers-included mixture and the hydrophobizing agent may vary in accordance with the type of the acid halide. Whether the reaction has been completed or not may be determined by finding a peak of C═O stretching vibration of ester from an infrared spectrum. Any pressure for hydrophobizing reaction may be employed and it may be performed under the pressure of the atmosphere.

An amount of solvent for reaction to be used may preferably be around between 0.1 and 1000 weight part, more preferably around between 1 and 500 weight part, and yet more preferably around between 10 and 100 weight part, per 100 weight part of the cellulose-fiber-included mixture.

As halogen is generated as a result of the reaction using acid halide, base to neutralize this may be required. A base to be used may be normally alkali metallic hydroxide, in particular sodium hydroxide. The amount of base to be used against the acid halide may be such that base/acid halide=1.0 to 1.5 in molar ratio.

In a reaction using acid halide, if required, catalyst may be used. Pyridine, 4-dimethylaminopyridine, 4-pyrrolidinopyridineand and so on may be used, and preferably 4-dimethylaminopyridine may be used.

An amount of catalyst to be used may preferably be between 0.01 and 10000 mole, more preferably between 0.02 and 5000 mole, and yet more preferably between 0.02 and 3000 mole, per 1 mole of glucose unit of cellulose. If an amount of catalyst is equal to or greater than 1 mole, the catalyst may also serve as a solvent. If this amount is greater than 10000 mole per glucose, it may not effectively serve as a catalyst. If it is less than 0.01 mole, the reaction may require quite long period of time.

The hydrophobizing reaction may be performed under water, and it may be performed in non-aqueous solvent. As for the non-aqueous solvent, alcohol such as methanol, ethanol, propanol, isopropanol, butanol and so on; solvent halide such as methylene chloride, chloroform, carbon tetrachloride and so on, ketone system solvent such as acetone, methylethyl ketone and so on, ether such as THF, ethylene glycol, propylene glycol, polyethylene glycol and so on, methyl, dimethyl, ethyl, and diethyl compounds thereof, amidated solvent such as dimethylformamide, dimethylacetamide and so on, and nonpolar solvent such as hexane, heptane, benzene, toluene and so on, or mixed solvent thereof. Mixed solvent of two or more solvents selected from the above group may be used.

2) Half-Esterification and Neutralization Reaction by "Alkyl or Alkenyl Succinic Anhydride"

An amount of "alkyl or alkenyl succinic anhydride" to be used may preferably be between 0.1 and 1000 weight part, more preferably between 0.5 and 500 weight part, and yet more preferably between 1 and 500 weight part, per 100 weight part of the cellulose-fiber-contained mixture.

The reaction temperature of the cellulose-fiber-included mixture and the alkyl or alkenyl succinic anhydride may preferably between 100 and 200° C., more preferably between 100 and 180° C., and yet more preferably between 100 and 150° C. Further, a period of time for the reaction of celolose-fibers-included mixture and the hydrophobizing agent may vary in accordance with that type. Whether the reaction has been completed or not may be determined by finding a peak of C═O stretching vibration of ester from an infrared spectrum. Any pressure for hydrophobizing reaction may be employed and it may be performed under the pressure of the atmosphere.

The reaction of the cellulose-fiber-included mixture and the "alkyl or alkenyl succinic anhydride" may be performed under any anhydrous condition and may not be limited to a particular condition. For example, the following methods and so on can be listed:

i) A method in which the cellulose-fiber-included mixture is dried and then dispersed in an organic solvent, alkyl or alkenyl succinic anhydride is added thereto and it is heated and mixed to promote the reaction.
ii) A method in which hydrous cellulose fibers are dispersed in an organic solvent and then it is filtered; after removing the solvent to some degree, the filtrate is re-dispersed in an organic solvent and these processes are repeated in an effort to remove the water; after it is dispersed by a so-called solvent substitution method, alkyl or alkenyl succinic anhydride is added thereto, and it is heated and mixed to promote the reaction.
iii) A method in which liquid cylic acid anhydride including hydrophobic group is added to a hydrous cellulose fiber, and then it is mixed while being heated to be dried; and that cellulose-fiber-included mixture is dispersed in a liquid of alkyl or alkenyl succinic anhydride such that the reaction of the cellulose fiber and the cylic acid anhydride including hydrophobic group advances.

The method of iii) may be particularly suitable among others as not only the reaction density is high and reaction is efficient but also there is no need to remove the solvent after the reaction.

As for the organic solvent, alcohol such as methanol, ethanol, propanol, isopropanol, butanol and so on; solvent halide such as methylene chloride, chloroform, carbon tetrachloride and so on; ketone system solvent such as acetone, methylethyl ketone and so on; ether such as THF, ethylene glycol, propylene glycol, polyethylene glycol and so on; and methyl, dimethyl, ethyl, diethyl diethyl thereof; amidated solvent such as dimethyl formamide, dimethyl acetamide and so on; nonpolar solvent such as hexane, heptane, benzene, toluene and so on; or mixed solvent of these solvents may be used. Mixed solvent of two or more selected from these may be used.

Catalyst may be used in the reaction, if required. Pyridine, 4-dimethylaminopyridine, 4-pyrrolidinopyridine and so on may be used and particularly 4-dimethylaminopyridine may be preferably used. An amount of catalyst to be used may preferably be between 0.01 and 10000 mole, more preferably between 0.02 and 5000 mole, and yet more preferably between 0.02 and 3000 mole, per 1 mole of glucose unit of cellulose. If an amount of catalyst is equal to or greater than 1 mole, the catalyst may also serve as a solvent. If this amount is greater than 10000 mole per glucose, it may not effectively serve as a catalyst.

Any reaction apparatuses for the reactions of i) to iii) may be employed only if they can perform heating and mixing, and may not be limited to a particular apparatus. For example, a flask provided with a mixing blade, a beaker provided with a stirring bar, a kneader, two-axial extruder, laboplasto mill, bead mill, ball mill and so on can be listed. Basically, the reaction may be liquid-solid reaction, and therefore the mixing apparatus with higher mixing efficiency may be preferable in order to improve the reaction efficiency. Thus, in particular, kneader, two-axial extruder, laboplasto mill, bead mill, ball mill and so on may be suggested.

Washing is not demanded after the reaction. Washing with an organic solvent may be performed in order to remove the unreacted cylic acid anhydride including hydrophobic group. It may be preferable to neutralize a part of the whole of carboxyl group generated by the reaction. Any alkali may be used for the neutralization only if it is capable of neutralizing and may not be limited to a particular substance. For example, hydroxide of alkali metal such as sodium hydroxide, potassium hydroxide and so on can be listed.

Hydrolysis of the cellulose and so on included in the cellulose fiber maybe induced if great mechanical shear force is applied by a bead mill and so on without neutralizing the carboxylic acid. This may results in cutting of the obtained microfibrillated cellulose fibers, and may not be preferable.

EXAMPLES

Hereinafter, explanation is made on examples. In examples 1 to 5, a polyamide PA11 having a melting point of 190° C. was used as a thermoplastic resin. In examples 1, 2, 4, and 5, polyamide PA11 having high viscosity named Rilsan (a registered trademark) BESNO produced by Arkema was used. In example 3, polyamide PA11 having low viscosity named Rilsan (a registered trademark) produced by Arkema was used. Cellulose fibers dispersed in the polyamide according to the above-described method were microfibrillated ones, and NBKP pulp was used for the mixture to be processed for microfibrillation. $TiO_2$ was used as white inorganic pigment. Mass % of each ingredient in the mixture is shown in Chart 1. In the examples, the total mass % of the thermoplastic resin and the cellulose fibers is calculated to be 100%. Pigment was treated as separate external factor. The manufacturing of the fastening component was performed in accordance with the manner explained with reference to FIG. 4. In examples 1 to 5, specimens having length*width*thickness 80*10*4 mm were produced in replace of producing fastening components. The features of the specimens will directly reflect the features of the fastening components.

Bending elastic modulus and bending strength were measured in accordance with the above-described method. The same explanation holds true for the melt viscosity. Regarding the melt viscosity, condition 1 indicates that the shear velocity is 12.16 $sec^{-1}$, and condition 2 indicates that the shear velocity is 12160 $sec^{-1}$. As for M/N, $3^{rd}$ or greater places after the decimal point were rounded off.

TABLE 1

|  | Ex. 1 | Ex. 2 | Ex. 3 | Ex. 4 | Ex. 5 |
| --- | --- | --- | --- | --- | --- |
| Mass % of thermoplastic resin | 60% | 50% | 60% | 70% | 60% |
| Mass % of cellulose fibers | 40% | 50% | 40% | 30% | 40% |
| Mass % of pigment | 1.0% | 1.0% | 1.0% | 0.0% | 5.0% |
| Bending elastic modulus (Gpa) | 5500 | 6800 | 5300 | 4400 | 5410 |
| Bending strength (Mpa) | 116 | 125 | 100 | 101 | 117 |
| Melt viscosity M (condition 1) | 18680 | 23310 | 9160 | 8200 | 11760 |
| Melt viscosity N (condition 2) | 238 | 398 | 193 | 71.1 | 200 |
| M/N | 78.49 | 58.57 | 47.46 | 115.33 | 58.8 |

Table 2 shows comparative examples. In comparative example 1, Rilsan (a registered trademark) BESNO produced by Arkema was used as a thermoplastic resin. In comparative examples 2 and 4, prime polypro J106G was used as a thermoplastic resin. In comparative example 3, Tenac 7511C was used as a thermoplastic resin. In comparative example 1, as the mass % of the cellulose fibers was too high, and it was turned out that supplying the melt mixture into the die was not achievable. In comparative example 2, the mass % of the cellulose fibers was too low and enough bending strength was not obtained. In comparative example 3, similar to comparative example 2, enough bending strength was not obtained. Also, in comparative example 4, enough bending strength was not obtained. In comparative example 1, the measurements such as modulus of elasticity and so on were not obtained as molding itself was not achieved.

TABLE 2

|  | Comp. Ex. 1 | Comp. Ex. 2 | Comp. Ex. 3 | Comp. Ex. 4 |
|---|---|---|---|---|
| Thermoplastic resin (melting point) | PA11 (190 ° C.) | PP (170 ° C.) | POM (175° C.) | PP (170 ° C.) |
| Mass % of thermoplastic resin | 40% | 80% | 80% | 60% |
| Mass % of cellulose fibers | 60% | 20% | 20% | 40% |
| Mass % of pigment | 1.0% | 0.0% | 0.0% | 1.0% |
| Bending elastic modulus (Gpa) | N/A | 3200 | 4000 | 4400 |
| Bending strength (Mpa) | N/A | 80 | 90 | 44 |
| Melt viscosity M (condition 1) | N/A | 13300 | 1980 | 1727 |
| Melt viscosity N (condition 2) | N/A | 88.8 | 85 | 25.9 |
| M/N | N/A | 149.77 | 23.29 | 66.6 |

A feature of a fastening component that is in the form of a fastener slider will correspond to the bending elastic modulus, bending strength, melt viscosity of mixture and so on presented in each chart. The bending elastic modulus, bending strength, melt viscosity and so on should be measured not depending on the shape of the fastening components. Therefore, the fastening component shaped to be the fastener slider and so on may be fast shaped to be a specimen of a predetermined size and then measurement should be performed therefor.

Based on the above descriptions, the skilled person in the art would be able to add various modifications on the respective embodiments. The signs embedded in Claims are just for reference and should not be relied upon for narrowly construing claims.

REFERENCE SIGNS LIST

100: slide fastener
75: element row
81: fastener tape
90: fastener slider
92: slider body
94: post
98: pull
200: molding apparatus
201: cylinder
202: conveyance screw
203: introductory part
204: nozzle
210: mixer
221a: first mold
221b: second mold
220: molding part

The invention claimed is:

1. A fastening component that is a molded article of a mixture, the mixture comprising;
a thermoplastic polymer resin having a melting point of between 150 and 200° C., wherein the thermoplastic polymer resin comprises a polyamide;
microfibrillated cellulose fibers dispersed in the thermoplastic polymer resin; and
an inorganic pigment, wherein when the total mass % of the thermoplastic polymer resin and the cellulose fibers is set to be 100 mass %, the mass % of the cellulose fibers included in the mixture is greater than 35 mass % and less than 60 mass % and wherein
the mixture melted at a temperature of 220° C. has a melt viscosity of equal to or less than 500 Pa/s at shear velocity of 12160 sec$^{-1}$ and a melt viscosity of equal to or greater than 5000 Pa/s at shear velocity of 12.16 sec$^{-1}$.

2. The fastening component of claim 1, wherein when the total mass % of the thermoplastic polymer resin and the cellulose fibers is set to be 100%, the mass % of the cellulose fibers included in the mixture is equal to or greater than 35 mass % and equal to or less than 50 mass %.

3. The fastening component of claim 1, wherein the mass % of the inorganic pigment in the mixture is between 0.5 and 5 mass %, the inorganic pigment being added in addition to the total 100 mass % of the thermoplastic polymer resin and the cellulose fibers.

4. The fastening component of claim 1, a specimen having a predetermined size of 80 mm length, 10 mm width, and 4 mm thickness which is obtained through melting the fastening component has a bending strength that is equal to or greater than 100 MPa.

5. The fastening component of claim 4, wherein the specimen has a bending elastic modulus that is equal to or greater than 4000 GPa.

6. The fastening component of claim 1, wherein the fastening component is a fastener slider for a slide fastener.

7. The fastening component of claim 1, wherein when the total mass % of the thermoplastic polymer resin and the cellulose fibers is set to be 100 mass %, the mass % of the cellulose fibers included in the mixture is equal to or greater than 40 mass % and less than 60 mass %.

8. The fastening component of claim 1, wherein the microfibrillated cellulose fibers include hydrophobized transformed cellulose fibers.

9. The fastening component of claim 1, wherein the mixture melted at a temperature of 220° C. has a melt viscosity of equal to or less than 400 Pa/s at shear velocity of 12160 sec$^{-1}$ and a melt viscosity of equal to or greater than 8000 Pa/s at shear velocity of 12.16 sec$^{-1}$.

10. A manufacturing method of a fastening component, the method comprising:
supplying a melted mixture into a mold, the mixture comprising a thermoplastic polymer resin and microfibrillated cellulose fibers dispersed in the thermoplastic polymer resin, the melting point of the thermoplastic polymer resin being between 150 and 200° C., and the mass % of the cellulose fibers included in the melted mixture is greater than 35 mass % and less than 60 mass % when the total mass % of the thermoplastic polymer resin and the cellulose fibers is set to be 100 mass %; and
cooling the melted mixture filled in the mold,
wherein
the mixture melted at a temperature of 220° C. has a melt viscosity of equal to or less than 500 Pa/s at shear velocity of 12160 sec$^{-1}$ and a melt viscosity of equal to or greater than 5000 Pa/s at shear velocity of 12.16 sec$^{-1}$.

11. The manufacturing method of a fastening component of claim 10, wherein the mixture melted at a temperature of 220° C. has a melt viscosity of equal to or less than 400 Pa/s at shear velocity of 12160 sec$^{-1}$ and a melt viscosity of equal to or greater than 8000 Pa/s at shear velocity of 12.16 sec$^{-1}$.

12. The manufacturing method of a fastening component of claim 10, further comprising:
    mixing the thermoplastic polymer resin and microfibrillated cellulose fibers to disperse the microfibrillated cellulose fibers in the thermoplastic polymer resin.

\* \* \* \* \*

UNITED STATES PATENT AND TRADEMARK OFFICE
CERTIFICATE OF CORRECTION

Page 1 of 2

PATENT NO. : 9,505,915 B2
APPLICATION NO. : 14/416094
DATED : November 29, 2016
INVENTOR(S) : Takeshi Senba et al.

It is certified that error appears in the above-identified patent and that said Letters Patent is hereby corrected as shown below:

In the Specification

In Column 2, Line 21, delete "Pa/s" and insert -- Pa*s --, therefor.

In Column 2, Line 22, delete "Pa/s" and insert -- Pa*s --, therefor.

In Column 3, Line 48, delete "calorimeter)." and insert -- Calorimeter). --, therefor.

In Column 5, Line 36, delete "Pa/s," and insert -- Pa*s, --, therefor.

In Column 5, Line 38, delete "Pa/s." and insert -- Pa*s. --, therefor.

In Column 5, Line 45, delete "Pa/s," and insert -- Pa*s, --, therefor.

In Column 5, Line 47, delete "Pa/s," and insert -- Pa*s, --, therefor.

In Column 6, Line 31, delete "Pa/s" and insert -- Pa*s --, therefor.

In Column 6, Line 31, delete "Pa/s" and insert -- Pa*s --, therefor.

In Column 6, Line 34, delete "Pa/s" and insert -- Pa*s --, therefor.

In Column 6, Line 34, delete "Pa/s" and insert -- Pa*s --, therefor.

In Column 8, Line 8, delete "alicylic" and insert -- alicyclic --, therefor.

In Column 9, Line 32, delete "thicknes." and insert -- thickness. --, therefor.

In Column 10, Line 6, delete "$\epsilon i=0.0005$" and insert -- $\epsilon 1=0.0005$ --, therefor.

Signed and Sealed this
Sixth Day of June, 2017

Michelle K. Lee
*Director of the United States Patent and Trademark Office*

CERTIFICATE OF CORRECTION (continued)
U.S. Pat. No. 9,505,915 B2

In Column 10, Line 7, delete "$\varepsilon i=0.0005$." and insert -- $\varepsilon 1 =0.0005$. --, therefor.

In Column 12, Line 59, delete "cellolose" and insert -- cellulose --, therefor.

In Column 13, Line 15, delete "cylic" and insert -- cyclic --, therefor.

In Column 13, Line 20, delete "cylic" and insert -- cyclic --, therefor.

In Column 13, Line 63, delete "cylic" and insert -- cyclic --, therefor.

In the Claims

In Column 16, Line 12, in Claim 1, delete "Pa/s" and insert -- Pa*s --, therefor.

In Column 16, Line 14, in Claim 1, delete "Pa/s" and insert -- Pa*s --, therefor.

In Column 16, Line 46, in Claim 9, delete "Pa/s" and insert -- Pa*s --, therefor.

In Column 16, Line 48, in Claim 9, delete "Pa/s" and insert -- Pa*s --, therefor.

In Column 16, Line 64, in Claim 10, delete "Pa/s" and insert -- Pa*s --, therefor.

In Column 16, Line 66, in Claim 10, delete "Pa/s" and insert -- Pa*s --, therefor.

In Column 17, Line 3, in Claim 11, delete "Pa/s" and insert -- Pa*s --, therefor.

In Column 17, Line 5, in Claim 11, delete "Pa/s" and insert -- Pa*s --, therefor.